(12) United States Patent
Tucker

(10) Patent No.: US 7,850,857 B2
(45) Date of Patent: Dec. 14, 2010

(54) COLLECTOR WITH ADJUSTABLE INPUT/DISCHARGE TO CONTROL SEDIMENT REMOVAL

(76) Inventor: Randall L. Tucker, 7440 Township Road 95, Findlay, OH (US) 45840

( * ) Notice: Subject to any disclaimer, the term of this patent is extended or adjusted under 35 U.S.C. 154(b) by 99 days.

(21) Appl. No.: 11/910,867

(22) PCT Filed: Apr. 5, 2006

(86) PCT No.: PCT/US2006/012526

§ 371 (c)(1),
(2), (4) Date: Oct. 20, 2008

(87) PCT Pub. No.: WO2006/107984

PCT Pub. Date: Oct. 12, 2006

(65) Prior Publication Data

US 2009/0097920 A1 Apr. 16, 2009

Related U.S. Application Data

(60) Provisional application No. 60/668,331, filed on Apr. 5, 2005.

(51) Int. Cl.
*E02B 8/02* (2006.01)

(52) U.S. Cl. .............. 210/747; 210/803; 210/162; 210/170.1; 210/523; 405/74

(58) Field of Classification Search .............. 210/747, 210/803, 162, 170.04, 170.01, 523, 532.1; 405/74

See application file for complete search history.

(56) References Cited

U.S. PATENT DOCUMENTS

| | | | |
|---|---|---|---|
| 2,436,630 A | 2/1948 | Clegg | |
| 2,673,451 A * | 3/1954 | Gariel | 405/74 |
| 3,013,395 A | 12/1961 | Gaylord | |
| 3,638,432 A * | 2/1972 | Schoonmaker | 37/335 |
| 3,693,796 A * | 9/1972 | Michel et al. | 210/170.1 |
| 4,074,535 A * | 2/1978 | Schoonmaker | 405/52 |
| 4,397,503 A * | 8/1983 | Williams | 405/74 |
| 5,298,172 A * | 3/1994 | Smith | 210/747 |
| 6,042,733 A | 3/2000 | Tucker | |
| 6,953,528 B2 * | 10/2005 | Nesfield | 210/747 |

* cited by examiner

*Primary Examiner*—Christopher Upton
(74) *Attorney, Agent, or Firm*—Fay Sharpe LLP

(57) ABSTRACT

A collector for removing sediment from a waterway. The collector has a housing (24) with an opening (38) and an internal cavity (44) for receiving particles. Means for adjusting the type of sediment is provided. An inlet (120) communicates with the cavity for altering the amount of suction and controlling the water intake and the type of material removed.

16 Claims, 5 Drawing Sheets

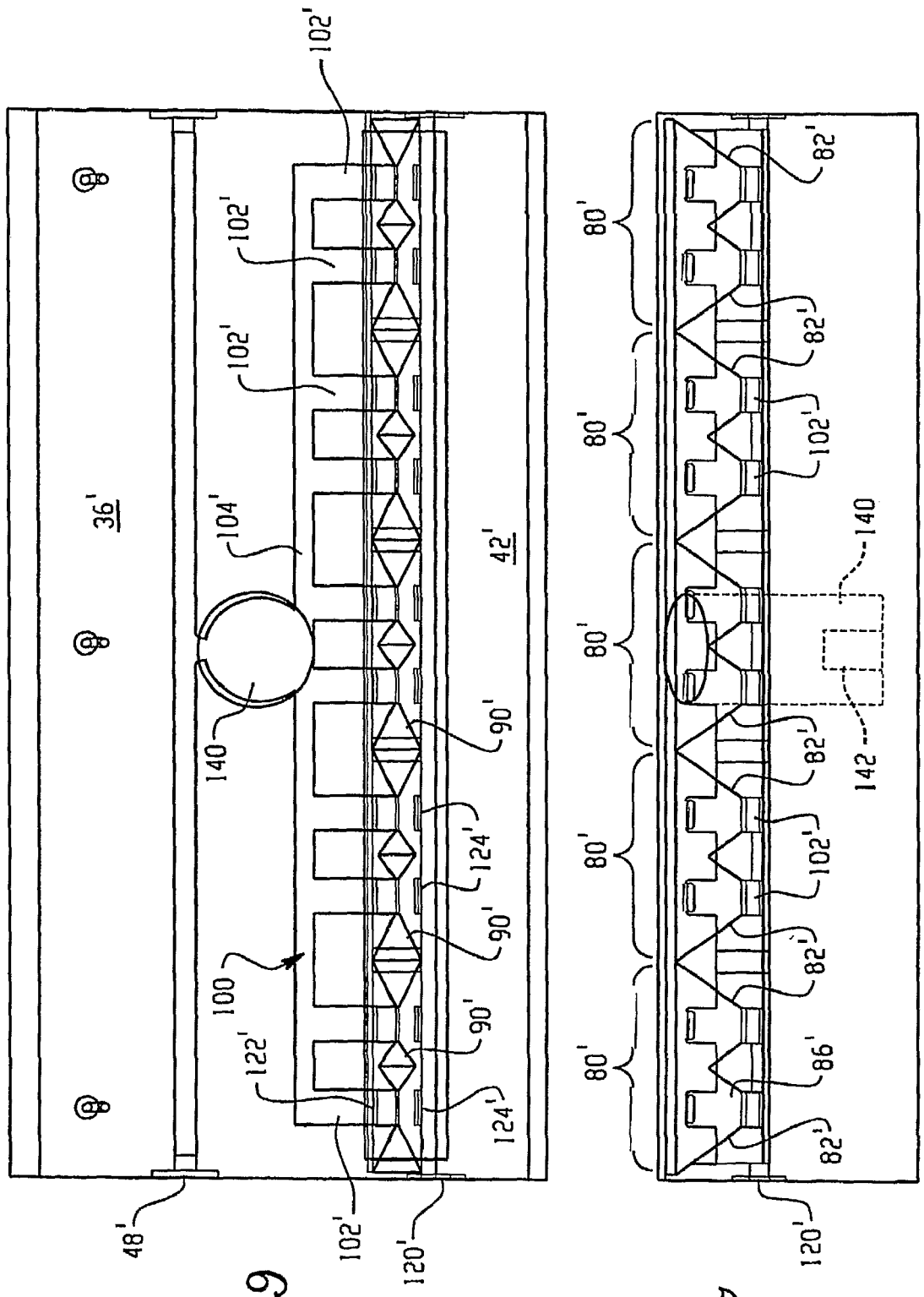

COLLECTOR WITH ADJUSTABLE INPUT/DISCHARGE TO CONTROL SEDIMENT REMOVAL

This application is a 35 U.S.C. 371 filing of International Application No. PCT/US2006/012526, filed 5 Apr. 2006, which claims priority from U.S. Provisional Application Ser. No. 60/668,331, filed Apr. 5, 2005, the disclosures of which are incorporated herein by reference.

This application claims priority from U.S. provisional application Ser. No. 60/668,331, filed 5 Apr. 2005.

BACKGROUND OF THE INVENTION

This invention relates to an apparatus and method of removing sediment, sand, gravel, fines, organic material, suspended material, debris, and/or particulates (generically referred to as sediment) from a waterway. It is also capable of removing colloids, heavy metals and contaminates that travel near the bottom of the flow. More particularly, this invention relates to a sediment removal system that can balance or tune a suction discharge from a collector with a return discharge to the collector. This balanced system reduces water intake requirements through a screen or prescreen as the water, and sediment carried by the water, proceed toward a collector cavity. The balanced system also reduces or eliminates impingement or capture of selected types of sediment, such as organic matter, during the pumping sequence. Thus, this system provides an assembly and a method of regulating removal of sediment from the waterway. The system can also be used in the reverse form to provide a flow of water out of the screen, which allows heavy particles or sediment to fall into the hopper through the flow, which cleans the particles or sediment of organics, or other materials.

U.S. Pat. No. 6,042,733 and patents claiming priority therefrom relate to a collector that provides a simple, economical structure effective in filtering and removing sediment from a waterway, such as a river, stream, creek, irrigation channel, tidal pool, estuary pool, ocean, etc. The details of the '733 patent are expressly incorporated herein by reference. The collector is typically installed on a bottom surface of the waterway. A leading or upstream end of the collector includes a sloping or tapering surface that compresses the water and sediment as it moves up the ramp. At least one opening is provided near an apex and/or trailing edge of the collector and the opening is typically covered by a screen or prescreen that determines the size of the sediment that can enter the collector opening. The opening interconnects and communicates with an interior cavity of the collector. As the velocity of the water carrying the sediment travels over the apex and trailing edge, the velocity of the water slows and heavier sediment settles from the flow and passes through the opening into the collector cavity.

A sediment removal passage or suction passage communicates with the cavity and periodically (or continuously) removes the collected sediment slurry from the collector. This sediment slurry is preferably removed to a filter that is typically mounted on the bank or shore of the waterway. A suction force, for example provided by a pump, directs the sediment slurry through the removal passage and directs the slurry to the filter where the water is separated from the sediment. Clean, filtered water is then returned to the waterway. The pump is typically operated on a periodic basis to remove the sediment gathered in the collector cavity, although it will be appreciated that in some systems it may be desirable to operate the pump continuously in order to remove sediment on a constant basis.

The collector is typically manufactured of a durable material such as metal or concrete. Of course, various materials of construction that are particularly suitable for the intended use and environment may be used without departing from the scope and intent of the invention.

As will be appreciated, when the sediment is pumped from the collector cavity, the suction force draws additional water and sediment from the waterway because the collector cavity communicates with the waterway through the opening. In certain applications, it is desirable to reduce or limit the amount of water intake that enters the collector during the pumping sequence. In other instances, it is desirable to regulate the type of material that is captured by the collector, i.e., to further control the type of sediment that is removed from the waterway. As is known from the '733 patent, the slope of the collector surfaces and the size of the openings and mesh size of the screens determine what type of materials are collected. In some instances, however, a flat collector (i.e., a collector without the sloped surfaces) may be desirable that still allows selectivity of the type of material removed from the waterway.

Therefore, a need exists to provide variability in the type or density of sediment collected, as well as providing for adjustable sediment removal with a flat collector.

SUMMARY OF THE INVENTION

The present invention provides a collector that meets the above-noted needs and others in a simple, effective, and economical manner.

More particularly, the collector includes means for balancing or regulating the suction/intake during the pumping sequence.

The preferred collector includes a fluid inlet, such as a water inlet, that introduces fluid into the collector cavity. The amount of fluid is regulated to be less than, approximately the same as, or greater than the fluid (e.g., water) removed through an outlet passage that communicates with the collector cavity. The outlet passage communicates the slurry to the shore where it is filtered.

When the flow through the inlet approximately equals that of the outlet passage, sediment drops into the collector opening primarily because of gravity and not solely as a result of suction forces. In this manner, the amount of sediment/water that is pulled through the screen is regulated or adjusted. This arrangement allows a tuned effect for optimal performance and desired removal of sediment.

This invention has the benefit of classifying materials, sizes, and type of sediment, for example, that is removed from the waterway by adjusting the amount of fluid or water introduced into the collector through the inlet.

This system advantageously allows sediment to be removed from the collector cavity without collecting anything (water or sediment) from above the openings of the collector.

The system can also be used to increase the amount of water returned to the waterway and create a positive flow from/through the grate opening which is used to eliminate fines or provides a washing effect to the removed component. That is, only larger particles are captured that have sufficient density so that gravity overcomes the positive flow emanating from the grate opening.

It is also contemplated that the collector could be buried or partially embedded in the bottom of the waterway so that, for example, only the grate opening is exposed. That is, the grate would be generally level with the bottom surface of the waterway and thus the invention provides additional advantages that have been previously unavailable in a flat collector. The collector can be buried into the waterway to provide a more aggressive removal of material by cause a headcutting in the waterway.

In another embodiment, the pump can be incorporated into the collector, rather than being located on shore.

Still other benefits and advantages of the invention will become apparent to those skilled in the art upon reading and understanding the following detailed description.

BRIEF DESCRIPTION OF THE DRAWINGS

FIG. 7 is an elevational view of a sub-pump basin collector.

FIG. 9 is a plan view of the collector of FIG. 6.

DETAILED DESCRIPTION OF THE INVENTION

Figure 1:
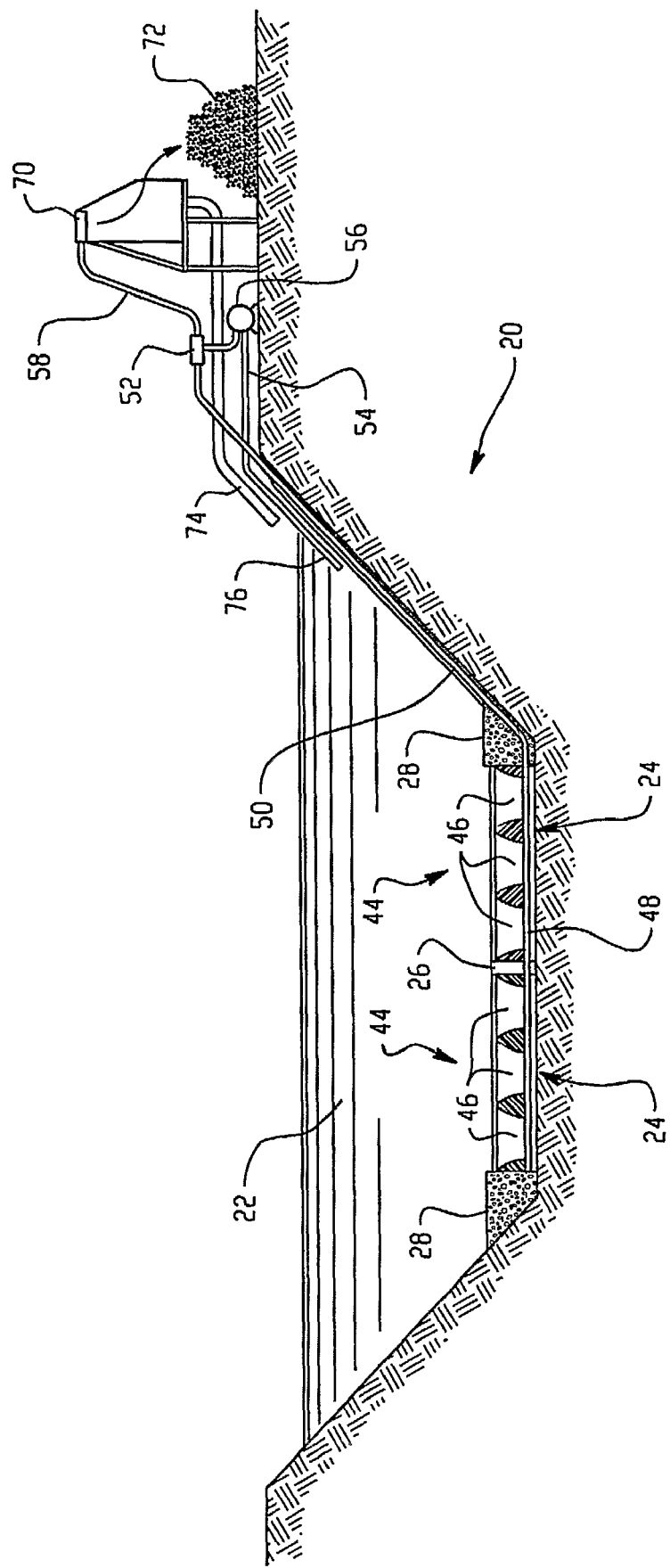
FIG. 1 is a schematic representation of a collector system associated with a waterway.

FIG. 1 illustrates a collector system 20 used in a waterway 22 for selectively removing sediment therefrom. Although this view illustrates installation of the collector system in an aqueduct, the invention should not be so limited in its use and can be used in a wide variety of waterways where sediment removal is an issue as noted above. The collector system preferably includes one of more collectors 24 that are typically located along a base or bottom surface of the waterway (or embedded in the bottom surface of the waterway as described below) and are usually oriented in a direction generally perpendicular to the water flow. If multiple collectors are used, the collectors are interconnected via connectors 26, and in this embodiment end blocks at each end of the system 8 are used in locating and securing the collectors in place. Thus, it will be appreciated that a series of collectors can be connected together, e.g., daisy-chained, to extend across various widths of a waterway or a portion of the width.

Figure 2:
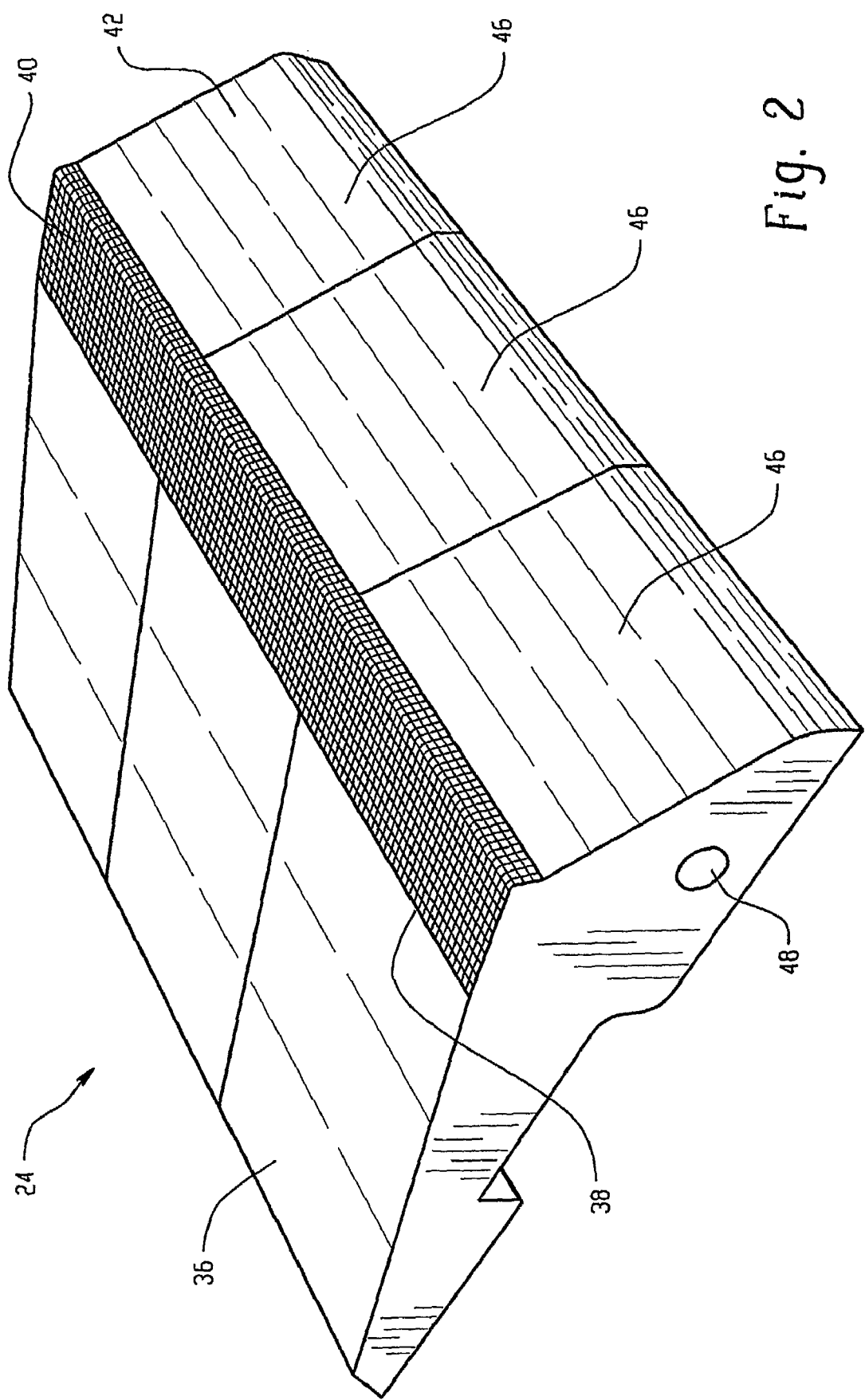
FIG. 2 is an enlarged perspective view of one type of collector.

With continued reference to FIG. 1, and additional reference to FIG. 2, one type of collector includes a housing having a leading, sloping upper surface 36 that extends to an apex opening or openings 38. In FIG. 2, the apex opening is covered by a coarse screen or grate 40. A trailing surface 42 extends rearwardly and downwardly from the apex usually at a greater angle than the first surface 36. Although not shown, it is also contemplated that the trailing surface 42 may include supplemental openings to capture additional sediment that does not enter the opening 38. The apex opening and any supplemental openings communicate with an internal cavity 44, shown here as being divided into separate compartments 46 (FIG. 1). A sediment removal or suction passage 48 communicates with the compartments of the cavity and, in this embodiment, is connected to a dredge line 50 that extends from the collectors along the sidewall of the aqueduct to an ejector 52. Preferably, a protective cover is provided over the dredge line as the line extends along the bank of the waterway. At the ejector, a pressurized line 54 from pump 56 (e.g., 200 gallons per minute at 100 psi) provides a venturi action in the ejector so that a suction force is provided to the dredge line to draw the collected sediment from the cavity. Pressurized flow proceeds from the ejector through line 58 to a filter assembly 70. In this manner, sediment 72 is removed or separated from the water in the filter, and a clean water return line 74 proceeds toward the waterway. The pump 56 preferably has its own intake line 76 submerged in the waterway and thereby provides the pressure flow to line 54 as required for the ejector to operate efficiently.

Figure 5:
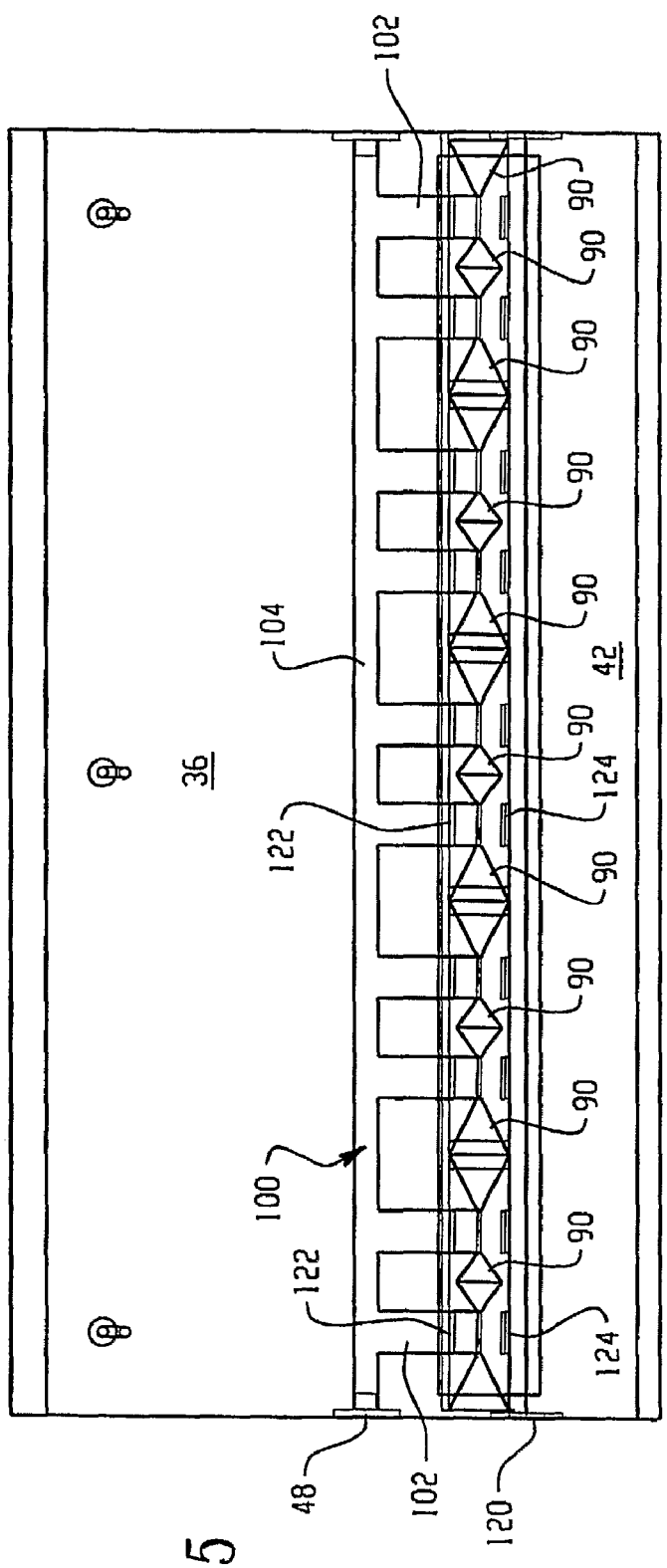
FIG. 5 is a plan view of the collector of FIG. 3.
Figure 3:
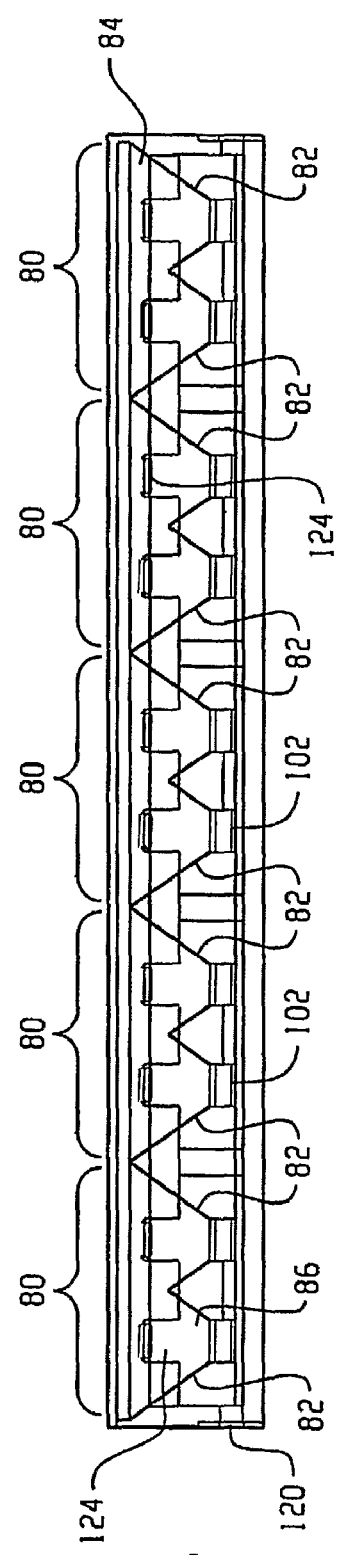
FIG. 3 is an elevational view of a collector.
Figure 4:
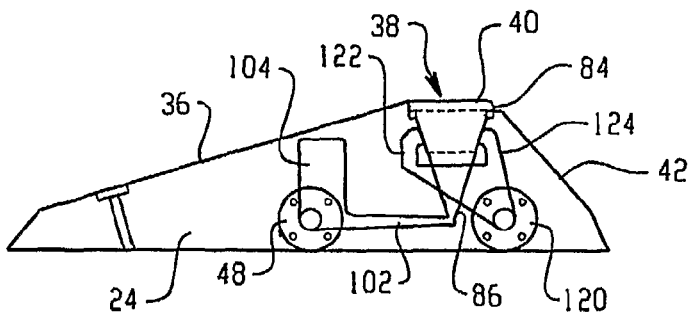
FIG. 4 is an elevational view of a collector with selected interior structural details shown schematically.

As more particularly illustrated in FIGS. 3-5, the collectors 24 are typically divided into separate sections or hoppers. For example, the illustrated collector, by way of example only, includes five (5) distinct sections 80, each including a pair of hoppers 82. The hoppers collectively define the internal cavity that receives sediment through opening 38 that is covered by screen 40 (FIG. 4). Each unit or hopper 82 may be removably inserted into the cavity of the collector if desired. The hopper is preferably manufactured of a durable, wear-resistant material such as urethane, and each hopper has a generally funnel or hopper shape that temporarily stores and transfers sediment from an upper end 84 at the base of the opening in the collector to a narrow, second end 86. Tapered sidewalls of the hopper provide a funneling action in the upper portion of each hopper. In addition, tapering dividers 90 provided along an intermediate region, again, direct the sediment toward the base portion 86. Of course, it will be appreciated by one skilled in the art that the hoppers need not be formed as removable insertions and, alternately, the tapered sidewalls can be formed in the collector.

The outlet 48 includes a manifold assembly 100 (generally shown in green in the color drawings of FIGS. 3-5). As illustrated, manifold passages 102 extend from a linear portion of outlet passage 104 at one end and communicate with the base of the individual hoppers at the other end. Thus, when a suction force is applied to outlet 48, the collected sediment is removed and transported to shore as illustrated in FIG. 1.

As will be appreciated, pumping sediment out of the collector will impose a suction force at the opening 38 and may undesirably draw sediment or excess water into the collector that would otherwise not enter the cavity. That is, there is an increased collection of water and sediment from the waterway during the pumping sequence that removes sediment from the collector. There is a need to pump the sediment out of the collector without affecting the intake of water and sediment through opening 38. The present invention provides an adjustment means that allows the system to be refined or tuned to remove selected sediment from the waterway, and particularly to achieve this during pump operation.

More specifically, the adjusting means includes a water inlet 120 shown in red in FIGS. 3-5. Particularly, water that is introduced through the inlet 120 balances or tunes the flow into collector openings 38. The inlet includes passages 122, 124 that communicate on either side of each hopper. Under certain circumstances, it may be desirable to decrease this suction at the collector. For example, a collector without this feature may inadvertently collect fish eggs at a hatchery from the waterway. Thus, a positive flow outwardly from the collector may be desirable to eliminate the collection of sediment such as fish eggs or fines, and only capture larger particles that have sufficient density to drop via gravity through a positive flow emanating from the grate. Thus, as one skilled in the art will appreciate, fine tuning the water introduced via inlet 120 allows the sediment to be classified and thereby fine-tune the sediment that is removed from the waterway by adjusting this parameter.

This feature could also beneficially pre-wash sand. For example, as water from the inlet 120 proceeds outwardly from the collector opening 38, any sand that enters the collector through the grate in a direction opposite to the positive flow will be stripped of organic matter and fines. Large particles of a predetermined threshold density, however, will pass through. The reverse turbulence can strip the fines from the surface of the sand. If the flow is large enough, it can even keep sand out of the collector and only allow heavier particles such as gravel to be captured in the collector.

The pump can be periodically operated, or in other instances it may be desirable to operate the pump on a continuous basis because the water is being returned to the waterway or stream. That is, water is not disposed of on shore and there is substantially no effective loss of water through use of the system.

The system design balances suction discharge of sand/water/sediment from the collector with a return discharge, or other source of water, into the collector cavity. This reduces the water intake requirements through the prescreen to the collector which also reduces or eliminates the impingement or capture of organic matter, for example, during the pumping sequence.

Figure 6:
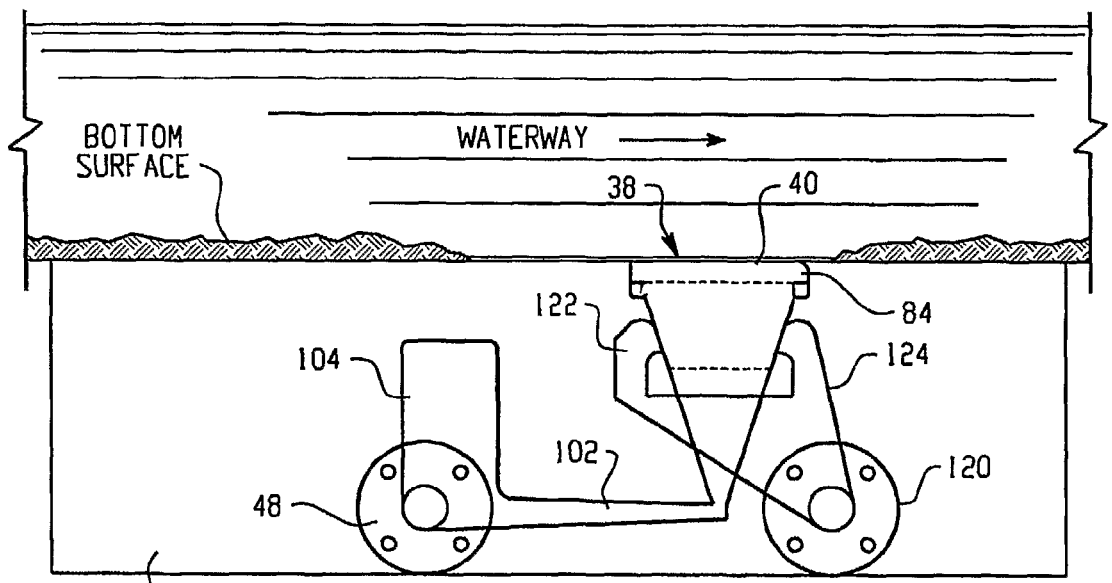
FIG. 6 is an end view of an alternative collector system using a water inlet to adjust the type of material that enters the collector.

As illustrated in FIG. 6, it is also contemplated that this arrangement will allow a collector to be buried. For example, a flat collector, i.e., one without sloping surfaces 36 or 42, can be placed on the bottom of the waterway, or even buried so that only the grate is exposed. When the grate or opening is level with the bottom of the waterway, the use of this type of flat collector is still useful in regulating the removal of sediment such as sand or fines, etc. Selective placement of the collector in certain areas of the waterway serves the desired sediment collection while use of an adjustable intake will allow tuning of the type of sediment to be removed from the waterway.

Figure 8:
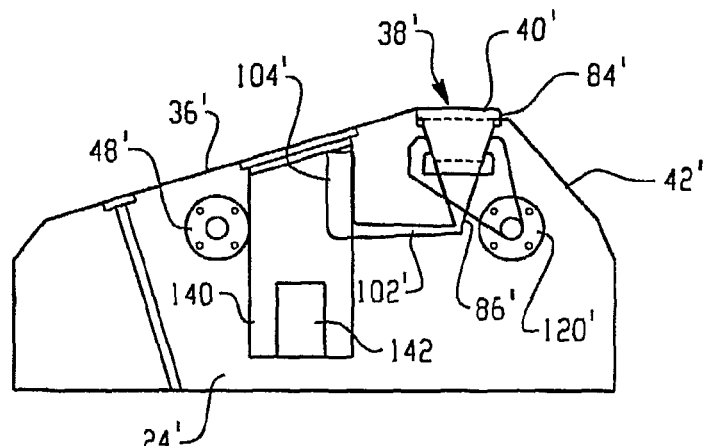
FIG. 8 is an end view of the sub-pump basin collector of FIG. 6.

FIGS. 7-9 are substantially identical to FIGS. 3-5. Accordingly for purposes of brevity, like components will be identified by like numerals with primed (') suffix and new elements will be identified by a new numeral. This system incorporates a sump pump basin 140 and a sump pump 142 located therein. Thus, rather than the pump being located on shore, the pump may be built into the collector. As will be appreciated, the sump pump basin communicates with manifold 100' of the outlet 48' so that a suction or negative pressure is still applied to passages 102' that communicate with the base of each hopper. This suction draws the collected sediment from the hopper, and the sump pump then applies a positive pressure to direct the material out of the collector through passage 48'. In substantially all other respects, the structures of FIGS. 7-9 are substantially identical to that of FIGS. 3-5, unless noted otherwise.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method of regulating removal of sediment from an associated waterway comprising:

providing a collector dimensioned for receipt in an associated waterway and having an opening that communicates with a collector cavity into which water and particulate material is received; and providing a separate flow into the collector cavity in a direction substantially opposite to a receipt direction of the water carrying particulate material from the associated waterway whereby the separate flow regulates a desired removal of particulate material from the associated waterway.

2. The method of claim 1 including altering the rate of the separate flow into the collector cavity.

3. The method of claim 2 wherein the rate of the separate flow is less than a rate of flow of the water and particulate material into the collector cavity.

4. The method of claim 2 wherein the rate of the separate flow is greater than a rate of flow of the water and particulate material into the collector cavity.

5. The method of claim 2 wherein the rate of the separate flow is approximately the same as the rate of flow of the water and particulate material into the collector cavity.

6. The method of claim 1 including at least partially embedding the collector into a bottom surface of the associated waterway.

7. The method of claim 1 further including providing a collector having a sloping leading end and a sloping trailing end.

8. The method of claim 7 wherein the opening is located between the leading and trailing ends of the collector.

9. The method of claim 1 wherein the separate flow providing step occurs during removal of collected particulate material from the cavity.

10. The method of claim 9 wherein the separate flow providing step includes incorporating a pump in the collector.

11. A collector for removing sediment or particulate materials from an associated waterway, the collector comprising:

a housing having an opening that communicates with an internal cavity for receiving sediment/particulate material from an associated waterway; and an adjusting mechanism that selects the type of sediment collected from the associated waterway, wherein the adjusting mechanism includes a passage that directs water flow from the associated waterway into the cavity in a direction substantially opposite to a receipt direction of sediment/particulate material from the associated waterway into the cavity.

12. The collector of claim 11 further comprising a pump communicating with the cavity for selectively removing sediment/particulate material from the cavity.

13. The collector of claim 11 wherein the housing includes a substantially planar surface containing the opening so that the collector is adapted to be substantially level with a bottom surface of the associated waterway.

14. The collector of claim 11 wherein the housing includes a sloping leading end and a sloping trailing end disposed on generally opposite ends of the opening.

15. The collector of claim 11 further comprising a pump received in the housing for removing sediment/particulate material from the cavity.

16. The collector of claim 11 further comprising a screen over the opening for controlling size of material that passes from the associated waterway into the cavity.

* * * * *